(12) United States Patent
Cornic et al.

(10) Patent No.: US 9,476,971 B2
(45) Date of Patent: Oct. 25, 2016

(54) METHOD OF RADAR SURVEILLANCE AND OF RADAR SIGNAL ACQUISITION

(75) Inventors: Pascal Cornic, Guilers (FR); Daniel Jahan, Bohars (FR); Patrick Garrec, Merignac (FR)

(73) Assignee: Thales, Courbevoie (FR)

( * ) Notice: Subject to any disclaimer, the term of this patent is extended or adjusted under 35 U.S.C. 154(b) by 427 days.

(21) Appl. No.: 14/005,813

(22) PCT Filed: Feb. 13, 2012

(86) PCT No.: PCT/EP2012/052376
§ 371 (c)(1),
(2), (4) Date: Oct. 17, 2013

(87) PCT Pub. No.: WO2012/123202
PCT Pub. Date: Sep. 20, 2012

(65) Prior Publication Data
US 2014/0091964 A1    Apr. 3, 2014

(30) Foreign Application Priority Data

Mar. 17, 2011  (FR) ..................................... 11 00803

(51) Int. Cl.
*G01S 13/02* (2006.01)
*G01S 7/02* (2006.01)
*G01S 7/36* (2006.01)
*G01S 13/90* (2006.01)

(52) U.S. Cl.
CPC .................. *G01S 13/02* (2013.01); *G01S 7/02* (2013.01); *G01S 7/021* (2013.01); *G01S 7/023* (2013.01); *G01S 7/36* (2013.01); *G01S 13/90* (2013.01); *G01S 2013/9064* (2013.01)

(58) Field of Classification Search
CPC .................................. G01S 7/36; G01S 7/021
See application file for complete search history.

(56) References Cited

U.S. PATENT DOCUMENTS

| | | | | |
|---|---|---|---|---|
| 5,434,570 A | * | 7/1995 | Wurman | ............... G01S 13/003 342/104 |
| 5,623,267 A | * | 4/1997 | Wurman | ............... G01S 13/003 342/26 D |
| 2005/0179584 A1 | | 8/2005 | Ohlsson | |
| 2009/0243911 A1 | * | 10/2009 | Cornic | ...................... G01S 7/40 342/36 |

FOREIGN PATENT DOCUMENTS

| | | |
|---|---|---|
| EP | 0810448 A2 | 12/1991 |
| EP | 0747722 A2 | 12/1996 |
| FR | 2884929 A1 | 10/2006 |
| FR | 2904696 A1 | 2/2008 |
| WO | 2006114426 A1 | 11/2006 |

\* cited by examiner

*Primary Examiner* — Matthew M Barker
(74) *Attorney, Agent, or Firm* — Baker & Hostetler LLP (57) ABSTRACT

A radar includes an antennal structure, with means for transmitting an impulse signal in a band centered on F1 according to a repetition period centered on a recurrence period Tr1 and pulse width T1, with means for receiving signals by the antenna in frequency band ΔF, with a unit for processing the signals received on a set of N distance bins. The signals received are transmitted by another radar in a frequency band centered on F2 where F2−F1≤ΔF, according to a repetition period centered on a period Tr2 and pulse width T2. The signals transmitted by the two radars are asynchronous. The method comprises: slaving frequency F1 to frequency F2, by measuring the power received integrated over the N distance bins and over several recurrences, determination of period Tr2 and T2 and slaving the period centered on Tr1 to a period centered on Tr2 with Tr1=k\*Tr2.

20 Claims, 5 Drawing Sheets

METHOD OF RADAR SURVEILLANCE AND OF RADAR SIGNAL ACQUISITION

CROSS-REFERENCE TO RELATED APPLICATIONS

This application is a National Stage of International patent application PCT/EP2012/052376, filed on Feb. 13, 2012, which claims priority to foreign French patent application No. FR 1100803, filed on Mar. 17, 2011, the disclosures of which are incorporated by reference in their entirety.

FIELD OF THE INVENTION

The field of the invention is that of onboard payloads for air-ground or air-sea observation and surveillance missions, notably radars for aircraft of small and medium size, for which the volume, the mass and the cost are very constrained.

BACKGROUND

From a physico-operational point of view, a radar function is aimed at detecting and locating the hardware objects situated in a, more or less distant, environment of a carrier. Among these objects are obviously the platforms or the vehicles situated in this environment. This point of view can be supplemented with depictions of the environment according to other domains of physical objects. Among the latter are radar transmissions originating from other platforms. An "Electronic Support Measure" or "ESM" function is aimed specifically at taking an interest in these radar transmission objects. Interest is at least twofold since, on the one hand, a depiction according to various domains ensures a consolidated perception of the environment, which is both more reliable and more robust, and on the other hand, the diversity of the characteristics of radar transmissions has implied that an ESM function possesses a fairly remarkable non-cooperative identification capability ("NCTR: Non Cooperative Target Recognition").

It is often beneficial to supplement one or more radar functions with an ESM function for better perception of the observed scene. The joint use of radar and ESM techniques is indeed able to provide information of such a nature as to classify, or indeed to identify, a target when the latter is equipped with a transmitting radar.

Customarily, the radar function and ESM function are obtained by integrating on the carrier distinct items of equipment having strictly no common hardware element, operating over fairly different frequency ranges. Each item of equipment possesses its own devices, be they antennal, for reception or transmission, and processing, thereby increasing the volume, the mass and the cost of the whole. Moreover, this architecture complicates integration on the carrier and always poses problems of electromagnetic compatibility between the radar functions and the ESM function, since the latter is on principle done so as to receive the transmissions of the radars.

Typically, if the aircraft must be equipped with a radar function and with an ESM function, the ESM coverage is ensured by very wideband antennas with low gain disposed on the skin of the aircraft so as to cover 360°, while the radar function is carried out with the aid of a specific antennal structure, able to operate by mechanical scanning or electronic scanning. There also exist other possibilities implementing array antennas with a very wideband radiating element and which are associated with a large number of transmission-reception pathways.

On carriers of small size, integration and cost constraints may prohibit the incorporation of such functions.

Consequently, there is still to date a need for a system that is simultaneously satisfactory in respect of all the aforementioned requirements, in terms of radar function and ESM function, of their electromagnetic compatibility, of constrained volume, mass and cost.

SUMMARY OF THE INVENTION

The invention relies on the implementation of several combined principles:

using the angular directivity of the antenna of the radar employed as base, to favor the detection of at least one given other radar transmission in a busy scene, carrying out an estimation of the parameters of the pulse train of the radar transmission of interest, at one and the same time on the carrier frequency, the repetition frequency and the width of the pulses, so as to slave the waveform of the radar (our function) to the waveform of the transmission of the radar of interest, using the distance resolution of the radar function, to temporally isolate the transmission of at least one radar of interest, with the aid of a specific correlator, using the frequency resolution and the frequency agility of the radar function, to isolate the signals received from the transmission of at least one radar of interest, constructing on reception, a matched filter adapted for a pulse train of the transmission of at least one radar of interest, slaving the synchronization and the duration of the radar recurrence to the radar or radars detected.

More precisely the subject of the invention is a method of surveillance by a radar termed radar 1 equipped:

with an antennal structure having angular directivity, for example of less than 10°, with means for transmitting an impulse signal S1 in a frequency band centered on a frequency F1 by means of a local oscillator, according to a repetition period centered on a recurrence period Tr1 and of pulse width T1, with means for receiving signals by said antenna structure in a frequency band ΔF, with a unit for processing the signals received on a set of N distance bins.

It is mainly characterized in that signals received being transmitted by another radar termed radar 2 in a frequency band centered on a frequency F2 such that F2−F1≤ΔF, according to a repetition period centered on a period Tr2 and of pulse width T2, the signals transmitted by the radar 1 and the radar 2 being asynchronous, it comprises the following steps carried out by said processing unit, to ensure an ESM function:

A) slaving of the frequency F1 to the frequency F2, by measuring the power received integrated over the set of N distance bins and over several recurrences, B) determination of the period Tr2 and of T2 and slaving of the period centered on Tr1 to a period centered on Tr2 with Tr1 a multiple of Tr2 (Tr1=k Tr2 with k a positive integer) or a sub-multiple of Tr2 (Tr1=Tr2/k with k a positive integer).

This method makes it possible to use the electronics of the radar to carry out in addition to the radar functions, an ESM function in a limited band around the operating frequency of the radar, without appreciably increasing the volume, the mass, the consumption, or the cost of the item of equipment.

Another advantage of the proposed solution is to optimize the rate of use of the onboard electronics, the radar function and ESM function being able to be carried out simultaneously and with no dead time, with the same item of equipment.

It also allows fine analysis of the pulses of a radar, for classification or identification purposes.

According to a characteristic of the invention, the slaving of F1 to F2 is carried out off-transmission of the radar 1 and comprises a sub-step consisting in varying the frequency of the local oscillator until a maximum of power of the signal received is obtained, the frequency of the local oscillator being fixed at the value corresponding to this maximum of power.

According to another characteristic of the invention, the determination of Tr2 and of T2 is based on the temporal autocorrelation of the amplitude of the signal received, performed over a time greater than a predetermined threshold.

Preferably, the signal S1 transmitted by the radar 1 being synchronized by a synchronization signal, the autocorrelation is synchronized by this synchronization signal.

This determination of Tr2 and of T2 is advantageously carried out off-transmission of S1.

According to one embodiment of the invention, the signal transmitted by the radar 1 being synchronized by a synchronization signal, this synchronization signal is adapted so that the signals of the radar 2 are received in a time window determined as a function of this synchronization signal.

This therefore makes it possible to limit the disruption caused by pulses of another radar transmitting elsewhere, by confining this disruption within a reduced time slice.

In certain cases matters are contrived so that, each recurrence of the repetition period comprising temporal distance bins, certain predetermined distance bins are allocated to the reception of echoes generated by the pulses transmitted by the radar 1.

Steps A) and B) can be carried out in a sequential manner according to predetermined time intervals, or in a manner engaged subsequent to the detection of an asynchronism of the signal received with respect to the signal transmitted by the radar 1 or of a signal power exceeding a predetermined threshold.

The radar 1 can successively be in transmission-reception mode and in reception mode without transmission.

The antenna of the radar 1 is for example in azimuthal rotation.

When received signals are transmitted by other radars termed radar 3, radar 4, . . . radar n respectively associated with the frequencies F3 with F3−F1≤ΔF, F4 with F4−F1≤ΔF, . . . , Fn with Fn−F1≤ΔF with the repetition periods Tr3, Tr4, . . . Trn and with the pulse widths T3, T4, . . . Tn, the signals transmitted by the radar 1 and the radar 3, radar 4, . . . radar n being asynchronous, it comprises steps A) and B) carried out sequentially for F3, Tr3, T3 then F4, Tr4, T4, and then . . . Fn, Trn, Fn.

Preferably, the main application is centered on a radar head dimensioned to operate in the X band, since this is the band used for airborne radars.

More particularly, it is sought to carry out SAR, GMTI and ESM functions simultaneously or sequentially on the basis of a single antennal device, while minimizing the volume of electronics to be implemented.

BRIEF DESCRIPTION OF THE DRAWINGS

Other characteristics and advantages of the invention will become apparent on reading the detailed description which follows, given by way of nonlimiting example and with reference to the appended drawings in which:

FIG. 1a is a schematic temporal representation of the signals transmitted and received by the radar 1, and FIG. 1b schematically represents a radar screen on which appear various detections visible in the course of the rotation of the antenna of the radar, FIG. 2a schematically represents the main elements of a radar, FIG. 2b schematically represents a sawtooth variation of the frequency Fol of the local oscillator of the radar 1 until a maximum of power is obtained in the receiver, FIG. 3 schematically represents a particular case of FIG. 2a with the introduction of a fast Fourier transform to separate the reception into several frequency channels before separating the signals temporally, FIG. 4 schematically illustrates the series of samples used in the receiver of the radar 1 to estimate the autocorrelation of the pulses received from the radar 2, over a long time, FIG. 5 schematically represents the autocorrelation function of the comb of pulses received from the radar 2, FIG. 6 schematically represents the case where Tr1 is slaved to Tr2, FIG. 7 schematically represents the case where Tr1 is slaved to a multiple of Tr2, FIG. 8 schematically represents the case where Tr1 is slaved to a sub-multiple of Tr2.

From one figure to another, the same elements are tagged by the same references.

DETAILED DESCRIPTION

Figure 1A:
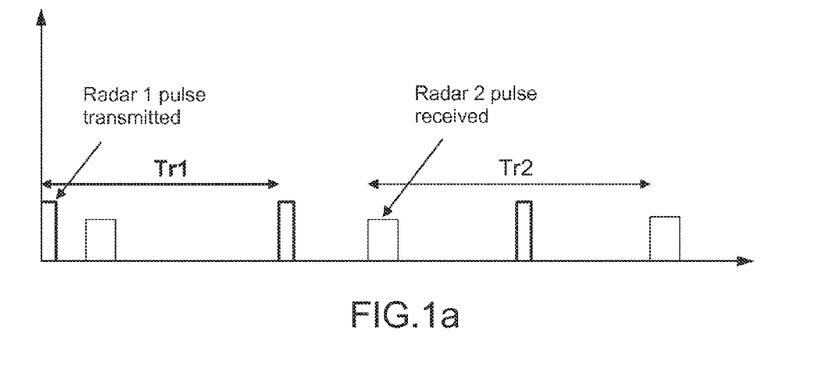

A pulse radar operating on a transmission frequency F1, of pulse width T1 and of repetition period Tr1 (also designated recurrence period) is considered in conjunction with FIG. 1a. In fact in practice the radar operates in a frequency band centered on F1 with a repetition period centered on Tr1.

Moreover, it is assumed that this radar possesses a small angular aperture Δθ1 at about 3 dB in the search plane considered (conventionally the bearing plane which is horizontal), i.e. Δθ1 typically less than 5°. The antenna can employ mechanical scanning or electronic scanning in transmission or in reception with a regular or irregular scan period.

For simplicity of description, this radar is called radar 1.

It is assumed that some other radar, subsequently dubbed radar 2, is present in the environment of the radar 1, and transmitting in its direction of sighting (or in the vicinity) and in a relatively close frequency band: the signal transmitted by the radar 2 may then be picked up by the reception device of radar 1 (antenna and receiver).

In the general case, this radar 2 has a transmission frequency F2, a pulse duration T2 and a repetition period Tr2. Just as for radar 1, in practice radar 2 operates in a frequency band centered on F2 with a repetition period centered on Tr2. These values are different a priori from those of radar 1.

Depending on the gap in transmission frequency between the two radars, F2−F1, the signals transmitted by radar 2 do or do not enter the receiver of radar 1.

In the case where the frequency gap F2−F1 is less than the reception band of the receiver ΔF of radar 1, these signals can be detected due to entering the reception device of radar 1.

Moreover, the two transmissions (of radar 1 and of radar 2) are asynchronous and the pulses may or may not be modulated.

The signals being asynchronous, the pulse received from radar 2 moves in the recurrence of radar 1, from recurrence to recurrence, as a function of the difference in the period of the pulse trains 1 and 2.

The temporal representation of the signals transmitted and received by the radar 1 is then in accordance with FIG. 1a.

Figure 1B:
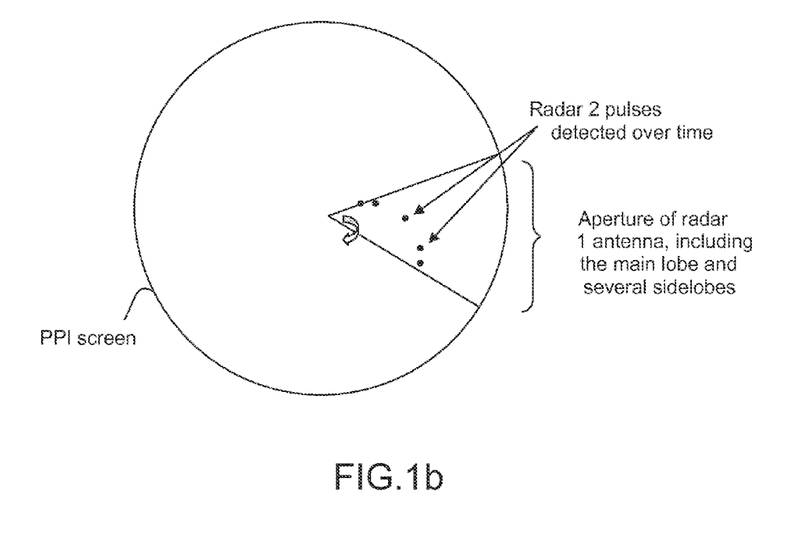

According to the conventional representation of a PPI radar screen (the initials standing for the expression "Plane Position Indicator"), this situation appears in the form of portions of spirals corresponding to the various detections visible in the course of the antenna rotation, in accordance with FIG. 1b. This is notably due to the fact that the signal received from radar 2 is very powerful, and visible, including by the sidelobes of the antenna of radar 1: thus, the pulses received from radar 2 seem to move radially and in terms of angle of azimuth as the antenna rotates.

Under these conditions, a conventional radar processing which associates from recurrence to recurrence the echoes received in one and the same distance resolution cell, also called a distance bin, cannot use the whole of the available energy to carry out the detection and the analysis of the pulse train received.

Moreover, the transmission of radar 2 is seen as temporally random noise that can limit the capabilities for detection of radar 1. Indeed, the echoes whose signal-to-noise ratio is generally lower than that of the signals originating from radar 2, may be drowned in the signals of radar 2.

The proposed processing consists in seeking for the presence of a radar 2 in a given band, and then in adapting the radar processing 1 so as to confine the signal received from the radar 2 within the confusion cell for radar 1. It comprises two main steps: the search for radar 2, and then subsequently the estimation of the repetition frequency Tr2 and of the pulse width T2 of radar 2.

Figure 2A:
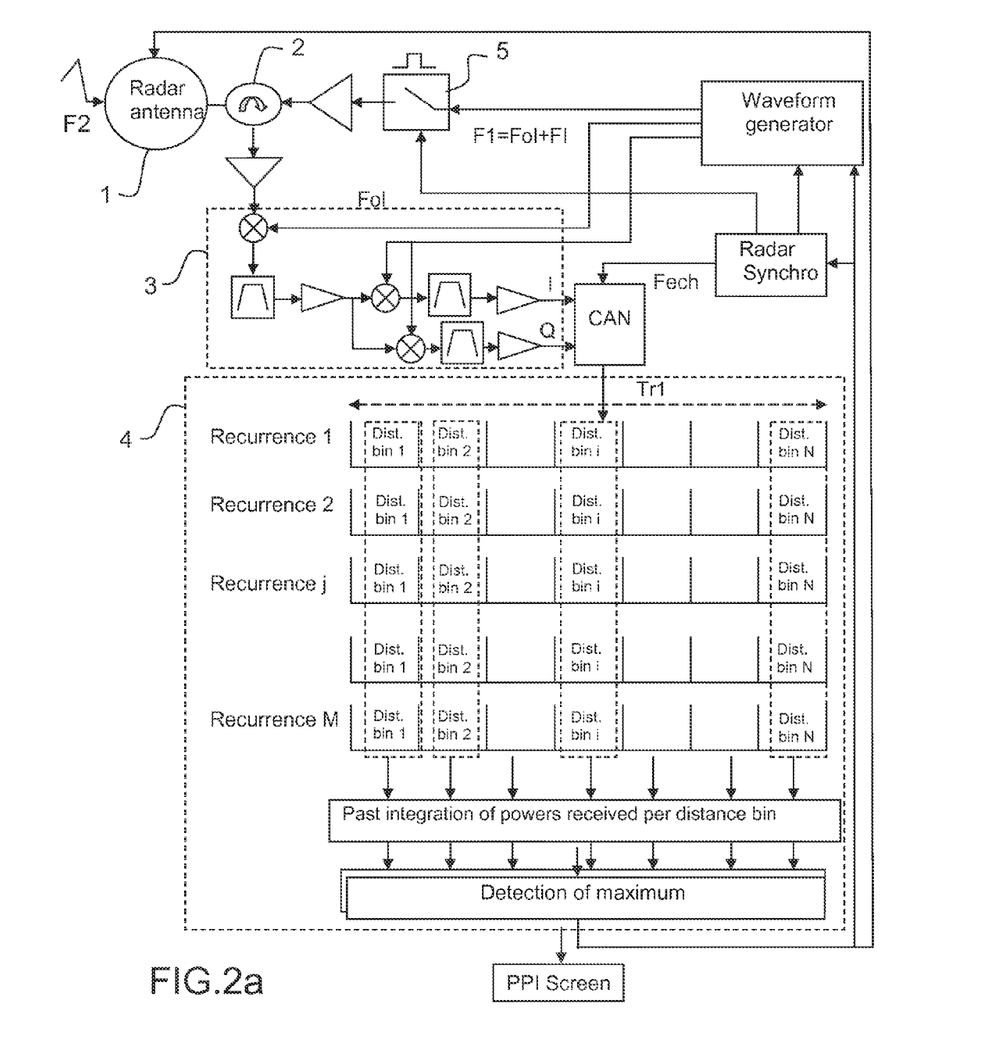

The main elements of a radar 1 in conjunction with FIG. 2a are recalled.

It comprises as reception means: a reception antenna 1, a circulator 2, a demodulator 3 linked to the local oscillator, an analog-digital converter for the demodulated signals received I, Q which is itself linked to a radar synchronization element, the converted signals being transmitted to a processing unit 4, linked to a PPI screen.

It comprises as transmission means: a waveforms generator linked to the processing unit 4 and to the synchronization element, a transmission antenna 1 which is generally the same as the reception antenna, a breaker 5 for optionally disabling transmission.

The search for radar 2 is performed firstly by measuring the power received integrated over the set of N distance bins and over a certain number M of recurrences.

This search is performed for example by varying the frequency of the local oscillator of the radar Fol until a maximum of power is obtained in the receiver, in accordance with FIG. 2.

Figure 2B:
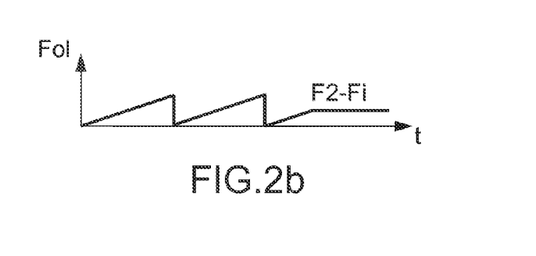

Conventionally, this search can be performed by a sawtooth frequency scan, according to the representation of FIG. 2b. This scan can be carried out in a continuous, sequential manner according to predetermined time intervals, or engaged subsequent to the detection of an abnormally high and predetermined signal power or of a difference in waveform between the signal received and the signal transmitted by the radar 1.

After detection of a maximum of power received in the scanned frequency band, the frequency Fol of the local oscillator is fixed at the value corresponding to the maximum of detected power.

A coarse automatic frequency control aimed at slaving the frequency F1 of radar 1 to that F2 of radar 2 is thus carried out.

In the presence of several radars, the same processing can be performed sequentially on different "other" transmitters designated radar 2, radar 3, etc.

In certain cases, it may be beneficial to separate the reception into several frequency channels before separating the signals temporally, so as to increase the radar discrimination capability.

Figure 3:
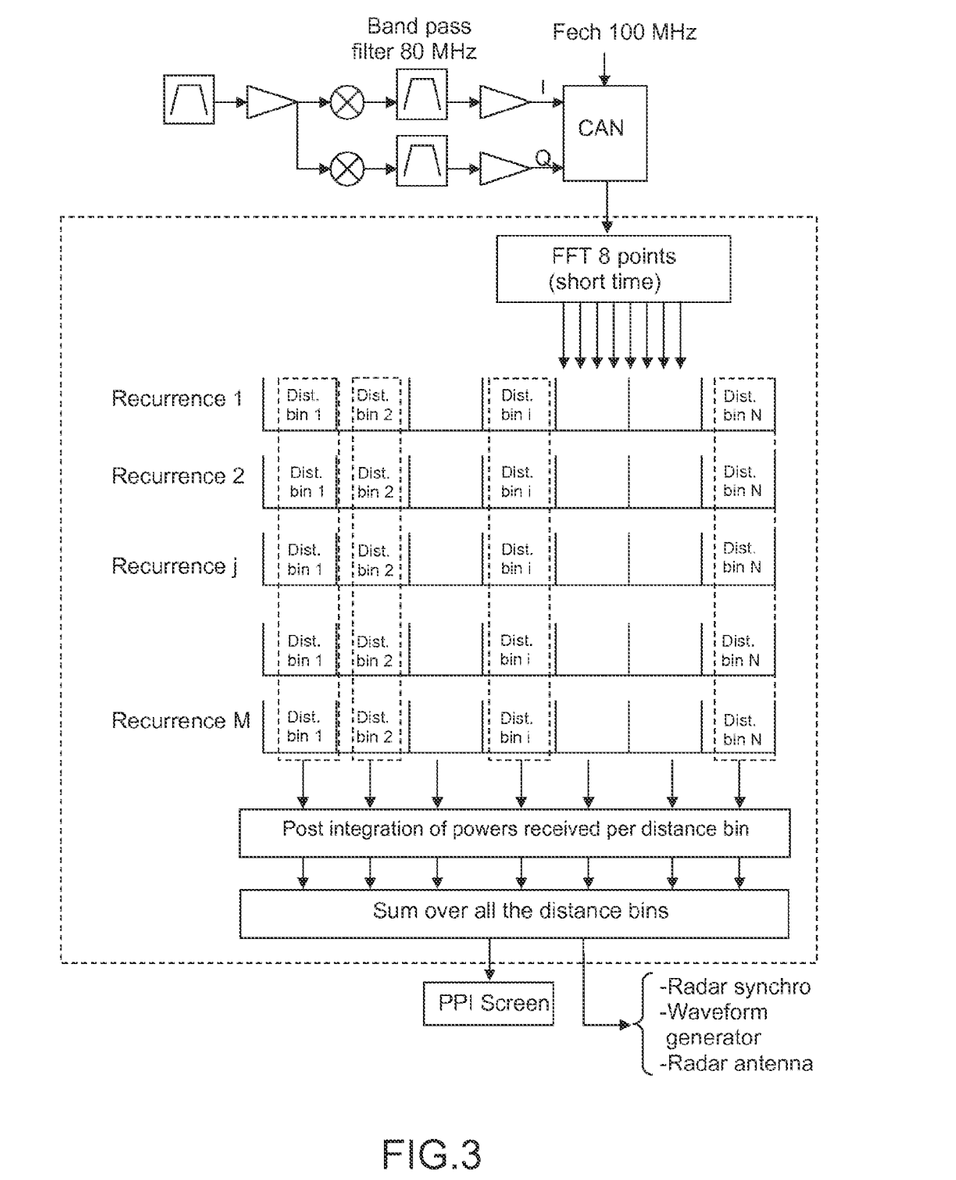

This can be performed for example by carrying out a fast Fourier transform (FFT) over a reduced time after coding of the signals, as illustrated in FIG. 3. "Reduced time" is intended to mean a duration of less than or equal to the duration of the shortest expected pulse received, corresponding to a small number of successive samples of the coded signal.

Typically, for a radar possessing a reception band of 80 MHz, and a sampling at 100 MHz, it will be possible to perform an FFT on 8 points, thus amounting to separating the signals by 8 filters of 12.5 MHz.

This method makes it possible to decrease the probability of the presence of signals originating from several "other" transmitters in the same reception channel F1 of radar 1.

Subsequently, the processing performs a temporal autocorrelation on the amplitude of the signal received over a long duration, this duration typically being greater than several times (that is to say at least 2) the duration of the assumed recurrence of radar 2 Tr2', so as to perceive this recurrence.

If x(i) is the amplitude of the temporal sample i detected at the coder output, the autocorrelation performs the operation:

$$C(k) = \Sigma_{i=1}^{N-k}((x(i)-\mathrm{avg}(x))(x(i+k)-\mathrm{avg}(x)))/N.$$

This processing is aimed at estimating the repetition frequency Tr2 and the pulse width T2 of the radar 2. It is applied at the output of the coder or, if appropriate, after the Fourier transform performed over the reduced time.

Figure 4:
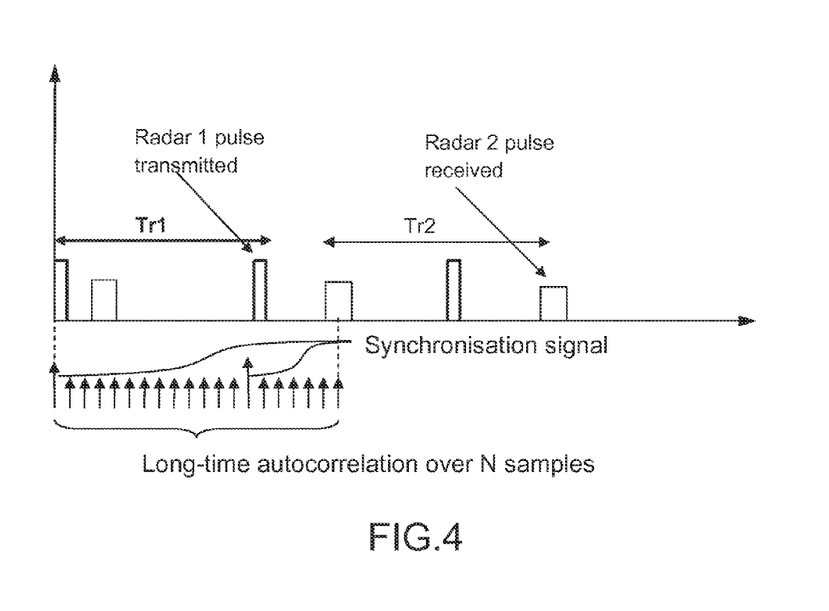

This autocorrelation is synchronized by the radar transmission synchronization signal, as shown by FIG. 4.

The sampling frequency is chosen greater than the inverse of the width of the pulse of minimum duration that it is desired to detect, typically 100 MHz for a minimum duration of 20 ns.

The temporal duration of the analysis window is chosen at least equal to twice the maximum duration of the repetition period Tr2 that it is desired to detect, typically 2.5 ms for a repetition period of maximum duration 1 ms.

This processing may optionally be repeated several times to improve the quality of the estimation.

Figure 5:
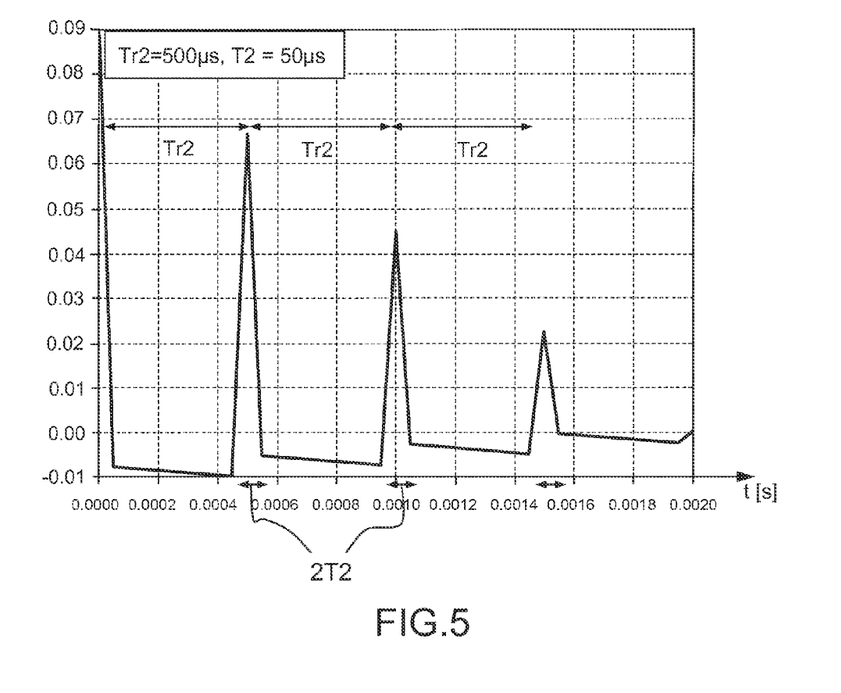

On output from the correlation processing, a string of triangular pulses is obtained, the distance between two successive pulses corresponding to the recurrence period Tr2 of the pulses and the width at the base of these pulses corresponding to twice the width of the elementary pulse T2, as shown by way of example by FIG. 5.

This operation is preferably performed off-transmission. It can however be performed in transmission by disabling reception for the duration of the transmission signal.

After estimation of the envelope modulation parameters of radar 2, the repetition frequency of radar 1 (Tr1) is slaved to the repetition frequency of radar 2 (Tr2).

According to the operating mode chosen, the repetition period of the pulses of radar 1 is chosen equal to the repetition frequency of radar 2, to a multiple (Tr1=k Tr2 with k a positive integer) or to a sub-multiple (Tr1=Tr2/k with k a positive integer).

Figure 6:
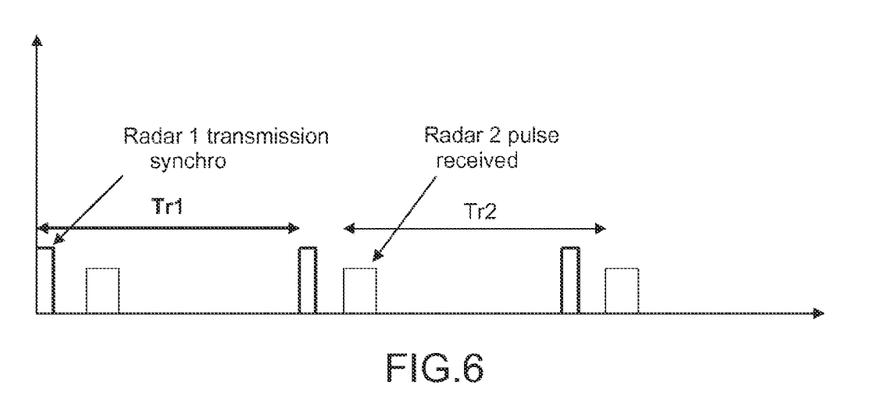

When the radar 1 is in listening mode only, that is to say when it absolutely does not transmit, its repetition period Tr1 will preferably be chosen equal to the repetition frequency Tr2 of radar 2 (we therefore have k=1), in such a way that the pulse train of radar 2 generates a single and fixed pulse from recurrence to recurrence in the receiver of radar 1, in accordance with FIG. 6. Although there is no transmission of radar 1, Tr1 is nevertheless slaved since it is beneficial that the pulses received from radar 2 appear fixed, always at the same place from recurrence to recurrence.

When the radar is in transmission mode, the recurrence period Tr1 is customarily chosen as a function of the desired instrumented range, corresponding to a non-ambiguous distance D, with D=(c.Tr1)/2, where c is the speed of propagation of the waves of interest, cf. that of light.

In this case, if the period Tr2 of radar 2 is small compared with the value corresponding to D, then a multiple of Tr2 greater than the value corresponding to the distance D, that is to say k an integer greater than 1, is preferably chosen as value of Tr1.

For example, for an instrumented distance of 40 nmi (nautical mile international=1852 m), i.e. about 74 km, the recurrence period Tr1 must be greater than 493 µs. It is recalled that the instrumented distance is the range up to which it is sought to detect.

Figure 7:
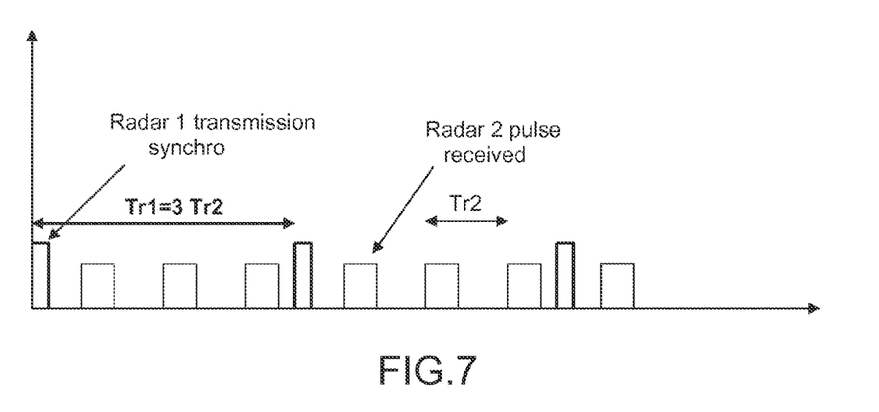

If radar 2 has a repetition period Tr2 of 200 µs, Tr1 can be chosen equal to 600 µs (Tr1 is a multiple of Tr2, Tr1=Tr2 k with k=3). In this manner, at each recurrence of radar 1, the receiver sees 3 pulses appearing in a fixed position in its distance bins, in accordance with FIG. 7.

Conversely, if the period Tr2 of radar 2 is large compared with the value corresponding to D, Tr1 can be chosen equal to Tr2 or to one of its sub-multiples, so Tr1=Tr2/k with k a positive integer.

Figure 8:
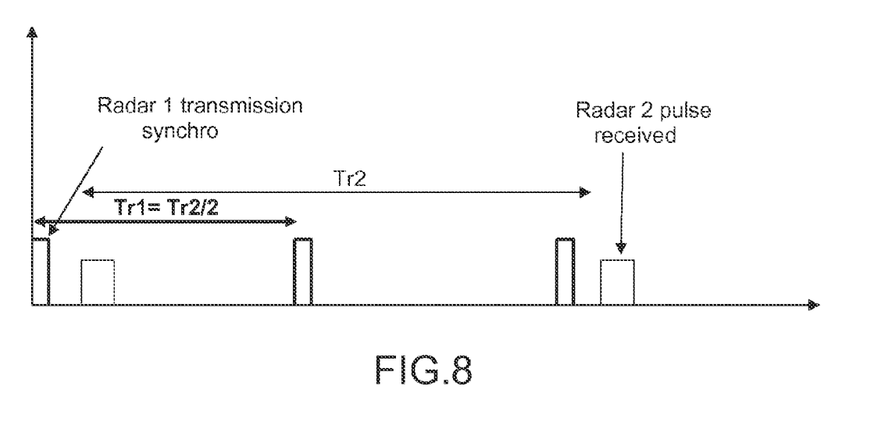

For example, for D=40 nmi (493 µs) and Tr2=1 ms, it will be possible to choose Tr1=500 µs (Tr1=Tr2/k with k=2). In this case, radar 2 produces a stable pulse in the receiver of radar 1 one recurrence out of 2, in accordance with FIG. 8.

In all cases, the repetition frequency Tr1 of radar 1 is chosen (that is to say a multiple or sub-multiple, and k chosen) so that the pulses received from radar 2 appear fixed in the receiver of radar 1.

In so far as T2<<Tr1 (we have typically T2=Tr1/100 or indeed Tr1/1000), this makes it possible furthermore to maintain a very significant part of the instrumented range in a "clear" zone, that is to say undisturbed by the radar 2.

Another solution is to launch an external correlator, which will realign the pulses by taking account of the difference in period between the two radars.

This also makes it possible to perform specific processings on the pulses received from radar 2, for classification or identification purposes by assigning a few distance bins suited to the pulse duration of radar 2 in the recurrence, upon the processing of these pulses.

The processings can concern the fine characteristics of the pulse: intentional or unintentional intra-pulse modulations (of phase, of frequency, of amplitude), or else the variations from pulse to pulse (of phase, of amplitude, of frequency), or indeed the antenna lobe modulations, etc.

This method makes it possible moreover to optimize the resources of the radar.

In order to maintain the properties of temporal stability of the pulses over time the slaving of the recurrence period can be performed sequentially from burst to burst, the term burst here designating an integer number of recurrence of the radar 1 on which a coherent doppler processing is performed: case of SAR (synthetic aperture radar), ISAR (inverse synthetic aperture radar) or GMTI (ground moving target indication) for example. In this case, an association and tracking processing is performed on the ESM and radar signals, this processing consisting in associating the ESM and radar detections by correlating the signals arising from the same angular directions with the objective of associating a given radar 2 with the radar target which carries it.

The joint use of the radar technique and ESM technique is indeed able to provide information of such a nature as to classify, or indeed to identify, a target when the latter is equipped with a transmitting radar.

It is also possible to site the radar synchro as a function of the "clear" zones desired.

It is desired for example that the echoes of radar 1 not be disturbed by the pulses received from radar 2, that is to say that the echoes do not fall in the same distance bins as these pulses.

Indeed, for example in the case of air-sea surveillance, the radar of an aircraft situated at an altitude h from the sea, can only receive echoes sited on the sea at best after a time 2 h/c, the useful detection zones then lying temporally between 2 h/c and Tr1. The start-of-recurrence synchronization signal is therefore tailored in such a way that the pulses received fall in the time window lying between this synchro and synchro+2 h/c.

It should be noted that the proposed processing is applicable whatever the capabilities of agility of transmission frequency, of pulse repetition frequency or of intra-pulse modulation of the radar 2:

Agility of transmission frequency: the radar can have several frequency channels carrying out the same processing in parallel, Agility of pulse repetition: this is manifested by a variation of the position of the pulse of radar 2, from recurrence to recurrence. Nonetheless, the modulation rates are always low in practice (of the order of 10%) and it is always possible to slave the period of radar 1 to the mean period of radar 2; in this case a limited number of distance bins that are centered on a fixed mean position will be allocated to the processing of the pulses of radar 2, Intra-pulse modulation: this does not affect the autocorrelation processing on the amplitude of the signal.

Finally, the processing can be extended to the consideration of several simultaneous transmissions of "other" radars (radar 2, radar 3, etc.), insofar as these various transmissions correspond to mutually orthogonal (or quasi-orthogonal) functions, this always being the case in practice. Indeed, even by considering two other radars (radar 2 radar 3) transmitting at the same frequency (F2=F3) the same waveform (Tr2=Tr3), the probability that the pulses received from these two radars are simultaneous is very low. The autocorrelation processing will then be able to detect two different strings of pulses of the same period, and it will be possible to slave the period of radar 1 to this period, the pulses of the two radars then appearing in distinct distance bins.

The consideration of several simultaneous transmissions of "other" radars, which are mutually orthogonal, is carried out sequentially. The slaving of F1 to F2 and the determination and the slaving of Tr1 to Tr2 are carried out, followed by the slaving of F1 to F3 and the determination and the slaving of Tr1 to Tr3, etc.

From an operational point of view, the processing can be performed firstly in lookout mode, the radar 1 being active or passive, and its antenna being in azimuthal rotation. In this case, the detections of radar transmissions performed can be used to point the antenna in a direction of interest so as to simultaneously carry out the conventional surveillance radar function and the analysis of the "other" radar transmissions (ESM function).

Conversely, the processing can also be activated while the antenna is already pointed toward a target of interest locked onto previously by the radar 1 in active mode.

A typical use of the method is the analysis of a transmission of a navigation radar carried by a ship at sea, while an ISAR image of this ship is produced simultaneously.

The invention claimed is:

1. A surveillance system implemented by a first radar 1, comprising:
    an antenna structure,
    a transmitter configured to transmit an impulse signal S1 in a frequency band centered on a frequency F1 by a local oscillator, according to a repetition period aligned with a repetition period Tr1 and of pulse width T1,
    a receiver configured to receive signals by said antenna structure in a frequency band $\Delta F$,
    a processor configured to process the signals received in a set of N distance bins,
    wherein signals transmitted by a second radar 2 are received in a frequency band centered on a frequency F2 such that F2−F1≤$\Delta F$, according to a repetition period aligned with a period Tr2 and of pulse width T2, the signals transmitted by the first radar 1 and the second radar 2 being asynchronous, and
    said processor further configured to perform an Electronic Support Measure (ESM) function comprising:
        A) slaving the frequency F1 to the frequency F2, by measuring the power received integrated over the set of N distance bins and over a plurality of recurrences, and
        B) determining the period Tr2 and T2 and slaving of the period Tr1 to a period Tr2 with Tr1=k Tr2 or Tr1=Tr2/k with k being a positive integer.

2. The surveillance system implemented by a radar as claimed in claim 1, wherein the processor is further configured for slaving of F1 to F2 to be carried out off-transmission of the first radar 1 and comprises varying the frequency of the local oscillator until a maximum power of the signal received is obtained, the frequency of the local oscillator being fixed to a value corresponding to the maximum of power.

3. The surveillance system implemented by a radar as claimed in claim 1, wherein the processor is further configured for determination of Tr2 and of T2 based on a temporal autocorrelation of an amplitude of the signal received, performed over a time greater than a predetermined threshold.

4. The surveillance system implemented by a radar as claimed in claim 3, wherein the processor is further configured for determination of Tr2 carried out off-transmission of S1.

5. The surveillance system implemented by a radar as claimed in claim 1, wherein the signal transmitted by the first radar 1 is synchronized by a synchronization signal, and an autocorrelation is synchronized by this synchronization signal.

6. The surveillance system implemented by a radar as claimed in claim 1, wherein the signal transmitted by the first radar 1 is synchronized by a synchronization signal, the synchronization signal being generated so that the signals of the second radar 2 are received in a time window determined as a function of the synchronization signal.

7. The surveillance system implemented by a radar as claimed in claim 1, wherein during each recurrence of the repetition period comprising temporal distance bins, certain distance bins are allocated to a reception of echoes generated by pulses transmitted by the first radar 1.

8. The surveillance system implemented by a radar as claimed in claim 1, wherein the Electronic Support Measure (ESM) function implemented by said processor is carried out in a sequential manner according to predetermined time intervals.

9. The system as claimed in claim 1, wherein the Electronic Support Measure (ESM) function implemented by said processor is triggered subsequent to a detection of an asynchronism of the signal received with respect to the signal transmitted by the first radar 1 or to a detection of a signal power exceeding a predetermined threshold.

10. The surveillance system implemented by a radar as claimed in claim 1, wherein the first radar 1 is configured to be successively in transmission mode and in reception mode without transmission.

11. The surveillance system implemented by a radar as claimed in claim 1, wherein the antenna structure of the first radar 1 is configured to operate in an azimuthal rotation.

12. The surveillance system implemented by a radar as claimed in claim 1, wherein signals received being transmitted by other radars termed radar 3, radar 4, . . . and radar n respectively associated with frequencies F3 with F3−F1≤$\Delta F$, F4 with F4−F1≤$\Delta F$, . . . , and Fn with Fn−F1≤$\Delta F$ with repetition periods Tr3, Tr4, . . . and Trn and with pulse widths T3, T4, . . . and Tn, the signals transmitted by the first radar 1, the radar 3, the radar 4, . . . and the radar n being asynchronous, wherein the Electronic Support Measure (ESM) function implemented by said processor is carried out sequentially for F3, Tr3, T3 then F4, Tr4, T4, . . . and then Fn, Trn, Fn.

13. A method of surveillance by a first radar 1, comprising:
    transmitting with an antenna structure an impulse signal S1 in a frequency band centered on a frequency F1 by a local oscillator, according to a repetition period aligned with a repetition period Tr1 and of pulse width T1,
    receiving signals by said antenna structure in a frequency band $\Delta F$,
    processing the signals received in a set of N distance bins with a processor,
    wherein signals transmitted by a second radar 2 are received in a frequency band centered on a frequency F2 such that F2−F1≤$\Delta F$, according to a repetition period aligned with a period Tr2 and of pulse width T2, the signals transmitted by the first radar 1 and the second radar 2 being asynchronous, and further comprising the following steps carried out by said processor configured to perform an Electronic Support Measure (ESM) function:
        A) slaving of the frequency F1 to the frequency F2, by measuring the power received integrated over the set of N distance bins and over a plurality of recurrences, and
        B) determination of the period Tr2 and of T2 and slaving of the period aligned with Tr1 to a period aligned with Tr2 with Tr1=k Tr2 or Tr1=Tr2/k with k being a positive integer.

14. The method of surveillance by a radar as claimed in claim 13, further comprising slaving of F1 to F2 carried out off-transmission of the first radar 1 and comprises a sub-step of varying the frequency of the local oscillator until a maximum power of the signal received is obtained, the frequency of the local oscillator being fixed to a value corresponding at the maximum of power.

15. The method of surveillance by a radar as claimed in claim 14, wherein the determination of Tr2 is carried out off-transmission of S1.

16. The method of surveillance by a radar as claimed in claim 13, wherein the determination of Tr2 and of T2 is based on a temporal autocorrelation of an amplitude of the signal received, performed over a time greater than a predetermined threshold.

17. The method of surveillance by a radar as claimed in claim 13, wherein the signal transmitted by the first radar 1 is synchronized by a synchronization signal, and an autocorrelation is synchronized by this synchronization signal.

18. The method of surveillance by a radar as claimed in claim 13, wherein the signal transmitted by the first radar 1 is synchronized by a synchronization signal, the synchronization signal being generated so that the signals of the second radar 2 are received in a time window determined as a function of this synchronization signal.

19. The method of surveillance by a radar as claimed in claim 13, wherein during each recurrence of the repetition period comprising temporal distance bins, certain distance bins are allocated to a reception of echoes generated by pulses transmitted by the first radar 1.

20. The method as claimed in claim 13, further comprising:
   detecting at least one of the following: an asynchronism of the signal received with respect to the signal transmitted by the first radar 1 or a signal power exceeding a predetermined threshold,
   wherein steps A) and B) are performed subsequent to detecting either the asynchronism of the signal received with respect to the signal transmitted by the first radar 1 or the signal power exceeding a predetermined threshold.

* * * * *